United States Patent
Zhang et al.

(10) Patent No.: US 8,435,636 B2
(45) Date of Patent: May 7, 2013

(54) OPTICAL COMPENSATION FILMS OF BROMINATED STYRENIC POLYMERS AND RELATED METHODS

(75) Inventors: Dong Zhang, Uniontown, OH (US);
Jiaokai Jing, Uniontown, OH (US);
Zhikuan Lu, Hudson, OH (US);
Thauming Kuo, Kingsport, TN (US);
Brian Michael King, Jonesborough, TN (US); Xiaoliang Zheng, Akron, OH (US); Frank W. Harris, Boca Raton, FL (US); Ted Calvin Germroth, Kingsport, TN (US)

(73) Assignee: Akron Polymer Systems, Inc., Akron, OH (US)

( * ) Notice: Subject to any disclaimer, the term of this patent is extended or adjusted under 35 U.S.C. 154(b) by 686 days.

(21) Appl. No.: 12/429,645

(22) Filed: Apr. 24, 2009

(65) Prior Publication Data

US 2009/0316085 A1 Dec. 24, 2009

Related U.S. Application Data

(63) Continuation-in-part of application No. 11/731,366, filed on Mar. 29, 2007.

(51) Int. Cl.
*B32B 9/04* (2006.01)
*B32B 27/00* (2006.01)

(52) U.S. Cl.
USPC .................. 428/411.1; 428/500; 359/489.01; 359/489.02; 528/397

(58) Field of Classification Search .................. None
See application file for complete search history.

(56) References Cited

U.S. PATENT DOCUMENTS

| | | | |
|---|---|---|---|
| 3,386,965 | A | 6/1968 | Huffman |
| 4,461,886 | A | 7/1984 | Rogers et al. |
| 5,039,785 | A | 8/1991 | Irwin |
| 5,160,619 | A | 11/1992 | Yamaguchi et al. |
| 5,177,149 | A | 1/1993 | Angeli et al. |
| 5,189,538 | A | 2/1993 | Arakawa |
| 5,290,887 | A | 3/1994 | Hefner et al. |

(Continued)

FOREIGN PATENT DOCUMENTS

| | | |
|---|---|---|
| EP | 1 506 991 | 2/2005 |
| EP | 1 506 991 A3 | 8/2005 |

(Continued)

OTHER PUBLICATIONS

Zhang, D., et al., "Mesogen-Jacketed Liquid Crystal Polymers with Mesogens of Aromatic Amide Structure" Polymers for Advanced Technologies, Wiley & Sons, Bognor Regis, GB, vol. 18, No. 4, Apr. 1, 1997, pp. 227-233, XP000691535.

(Continued)

*Primary Examiner* — Hai Vo
*Assistant Examiner* — Chinessa Adkins
(74) *Attorney, Agent, or Firm* — Roger D. Emerson; Daniel A. Thomson; Emerson Thomson Bennett, LLC

(57) ABSTRACT

Some embodiments include compositions and/or methods related to optical compensation films. More particularly, some embodiments can include brominated polystyrene compositions, and/or methods for their preparation, suitable for forming optical compensation films. In some embodiments, suitable brominated polystyrene compositions, and/or methods for their preparation, can include aromatic rings having one or more acyl moieties.

7 Claims, 1 Drawing Sheet

U.S. PATENT DOCUMENTS

| | | | |
|---|---|---|---|
| 5,387,657 | A | 2/1995 | Hefner et al. |
| 5,396,355 | A * | 3/1995 | Wada et al. ............... 349/117 |
| 5,427,712 | A * | 6/1995 | Nakamura et al. ....... 252/299.01 |
| 5,529,818 | A * | 6/1996 | Tsuda et al. ............... 428/1.2 |
| 5,532,322 | A | 7/1996 | Kadono et al. |
| 5,580,950 | A | 12/1996 | Harris et al. |
| 5,677,390 | A | 10/1997 | Dadgar et al. |
| 5,698,676 | A | 12/1997 | Dhaon |
| 5,985,942 | A | 11/1999 | Steck et al. |
| 6,115,095 | A | 9/2000 | Suzuki et al. |
| 6,175,400 | B1 | 1/2001 | Duncan et al. |
| 6,881,454 | B2 * | 4/2005 | Taguchi ...................... 428/1.1 |
| 7,037,443 | B2 | 5/2006 | Shuto et al. |
| 7,135,211 | B2 | 11/2006 | Shuto et al. |
| 7,227,602 | B2 | 6/2007 | Jeon et al. |
| 7,236,221 | B2 | 6/2007 | Ishikawa et al. |
| 2002/0041352 | A1 * | 4/2002 | Kuzuhara et al. ........... 349/117 |
| 2004/0051831 | A1 | 3/2004 | Su Yu et al. |
| 2005/0057714 | A1 | 3/2005 | Jeon et al. |
| 2005/0105027 | A1 * | 5/2005 | Wada et al. ............... 349/117 |
| 2005/0200792 | A1 | 9/2005 | Jeon et al. |
| 2005/0270458 | A1 | 12/2005 | Ishikawa et al. |
| 2006/0062935 | A1 * | 3/2006 | Murakami ................. 428/1.31 |
| 2006/0114383 | A1 | 6/2006 | Kobayashi et al. |
| 2007/0020407 | A1 * | 1/2007 | Umemoto et al. .......... 428/1.31 |
| 2007/0046870 | A1 * | 3/2007 | Murakami et al. .......... 349/117 |
| 2007/0177087 | A1 | 8/2007 | Kawahara et al. |
| 2008/0239491 | A1 | 10/2008 | Zheng et al. |
| 2008/0241565 | A1 | 10/2008 | Germroth et al. |
| 2009/0068380 | A1 | 3/2009 | Zheng et al. |

FOREIGN PATENT DOCUMENTS

| | | |
|---|---|---|
| JP | 04 215 602 | 8/1992 |
| JP | 07 046 059 | 2/2007 |
| JP | 2007-063417 | 3/2007 |
| JP | 2007-231224 | 9/2007 |
| JP | 2009-067834 | 4/2009 |
| JP | 2009-079210 | 4/2009 |
| WO | 2008 121 584 | 10/2008 |

OTHER PUBLICATIONS

Zhang, et al., "Synthesis of a New Side-Chain Type Liquid Crystal Polymer Poly[dicyclohexyl vinylterephtalate]" Macromolecules, ACS, Washington, DC, U.S., vol. 32, Jan. 1, 1999, pp. 4494-4496, XP002495422, ISSN: 0024-9297.

Zhao, et al., Synthesis and Characterization of Diblock Copolymers Based on Crystallizable Poly(e-caprolactone) and Mesogen-Jacketed Liquid Crystalline Polymer Block: Polymer, Elsevier Science Publishers B.V., GB, vol. 46, No. 14, Jun. 27, 2005, pp. 5396-5405, XP004924379, ISSN: 0032-3861.

Li, et al., "Hierarchical Assembly of a Series of Rod-Coil Block Copolymers: Supramolecular LC Phase in Nanoenvironment" Macromolecules 2004, vol. 37, No. 8, pp. 2854-2860.

Luo, et al., "Conduction Mechanism in a Novel Oxadiazole Derivative: Effects of Temperature and Hydrostatic Pressure" J. Phys. D: Appl. Phys. vol. 38, 2005, pp. 1132-1135, IOP Publishing Ltd. Printed in the UK.

Chai, et al., "Synthesis and Characterization of Mesogen-Jacketed Liquid Crystalline Polymer Containing 1, 3, 4-Oxadiazole" Gaogenzi Huebao, 2006, vol. 3, pp. 532-535.

Li, F.; Harris, F.W.; Cheng, S.Z.D.; Polyimide Films As Negative Birefringent Compensators for Normally White Twisted Nematic Liquid Crystal Displays, Polymer vol. 37, No. 23, 1996, pp. 5321-5325.

Matthews, A. S.; Kim, I.; Ha, C.S.; Fully Aliphatic Polyimides From Adamantane-Based Diamines for Enhanced Thermal Stability, Solubility, Transparency, and Low Dielectric Constant, Dept. of Polymer Science and Engineering, Pusan National University, Busan, 2006, pp. 609-735, Korea.

Mehdipour-Antaei, S.; Babanzadeh, S.; New Types of Heat-Resistant, Flame-Retardant Ferrocene-Based Ployamides With Improved Solubility, Iran Polymer and Petrochemical Institute, P.O. Box 14965/115, Tehran, Iran (Available at ScienceDirect, Reactive & Functional Polymers 67, 2007, pp. 883-892.

Liou, G.S.; Hsiao, S.H.; Ishida, M.; Kakimoto, M.; Imai, Y.; Synthesis and Characterization of Novel Soluble Triphenylamine-Containing Aromatic Polyamides Based on N,N'-Bis(4-Aminophenyl)-N,N'-Diphenyl-1,4-Phenylenediamine; Journal of Polymer Science; Part A: Polymer Chemistry, vol. 40, 2002, pp. 2810-2818.

Phillips, R.E.; Soulen, R.L.; Propylene Oxide Addition to Hydrochloric Acid, Journal of Chemical Education, vol. 72, No. 7, Jul. 1995, pp. 624-625.

Seo, K.B.; Jeong, J.K.; Choi, S.J.; Hong, Y.T.; Suh, D.H.; Synthesis and Characterization of Novel Aromatic-Aliphatic Poly(Amide-Imide-Imide)S (PAII), Die Angewandte Makromolekulare Chemic 264, 1999, oo, pp. 30-38, (Mr 4590).

Ebadi, H.; Mehdipour-Ataei, S.; Heat-Resistant, Pyridine-Based Polyamides Containing Ether and Ester Units With Improved Solubility, Chinese Journal of Polymer Science, vol. 28, No. 1, 2010, pp. 29-37.

Mehdipour-Ataei, S.; Hatami, M.; Mosslemin, M.H.; Organosoluble, Thermally Stable Polyamides Containing Sulfone and Sulfide Units, Chinese Journal of Polymer Science, vol. 27, No. 6, 2009, pp. 781-787.

Chai, C.; Wang, J.; Fan, X.; Chen, X.; Zhou, Q.; Synthesis and Characterization of Mesogen Jacketed Liquid Crystalline Polymer Containing 1, 3, 4-Oxadiazole, Beijing National Laboratory for Molecular Science, Key Laboratory of Polymer Chemistry and Physics of Ministry of Education College of Chemistry and Molecular Engineering, Peking University, Beijing, 2006, 532-535.

Liu, J.M.; Lee, T.M.; Wen, C.H.; Leu, C.M.; High Performance Organic-Inorganic Hybrid Plastic Substrate for Flexible Display and Electronics, MCL, Industrial Technology Research Institute, Chutung, Hsinchu, 310 Taiwan, ROC, SID 10 Digest, pp. 913-916.

Ito, H.; Oka, W.; Goto, H.; Umeda, H.; Plastic Substrates for Flexible Displays, JP Journal of Applied Physics, vol. 45, No. 5B, 2006, pp. 4325-4329.

* cited by examiner

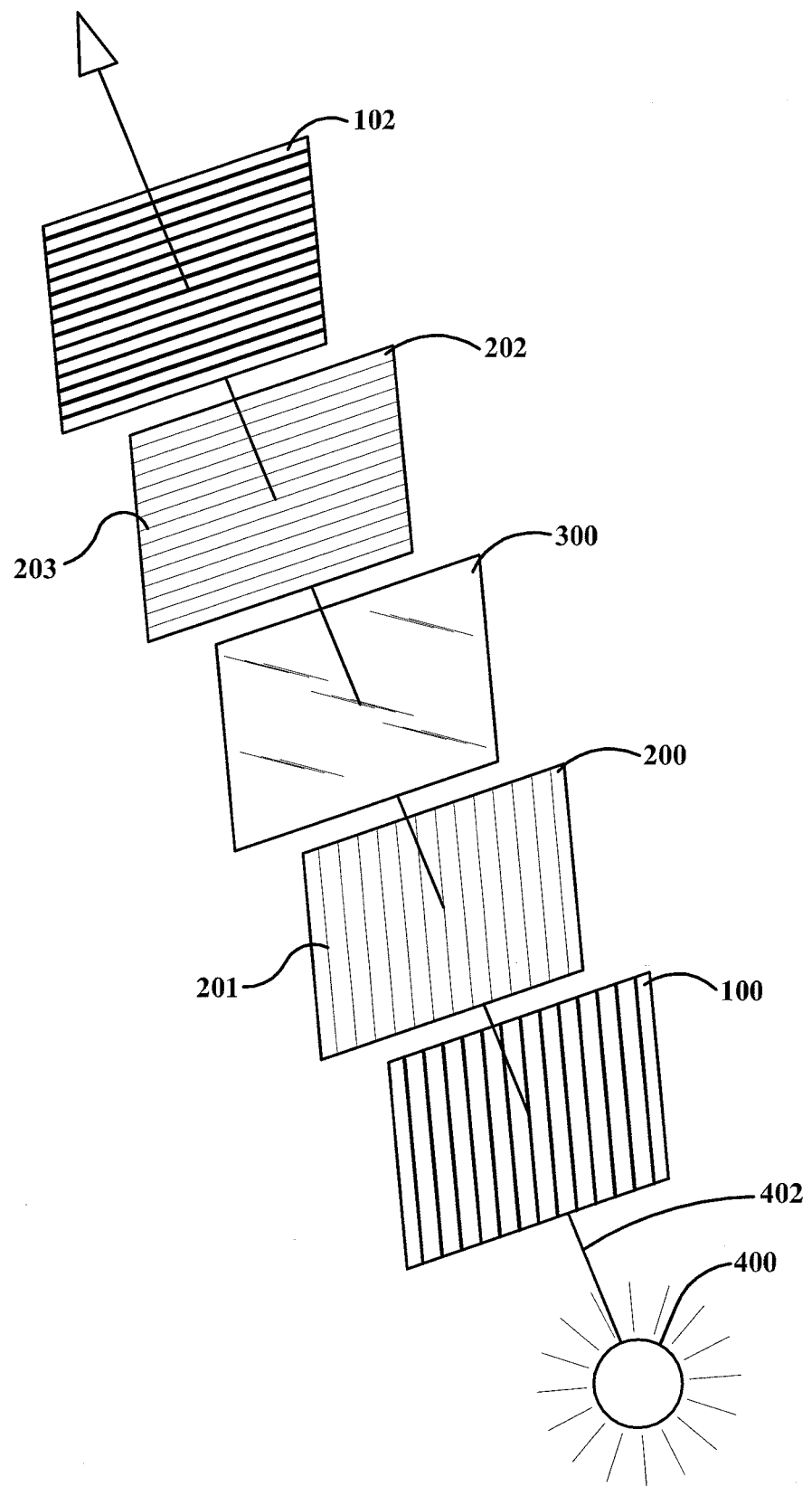

OPTICAL COMPENSATION FILMS OF BROMINATED STYRENIC POLYMERS AND RELATED METHODS

I. BACKGROUND OF THE INVENTION

A. Field of Invention

This invention generally relates to brominated styrenic polymers suitable for optical film and/or liquid crystal display applications, and processes for their preparation. Some embodiments may have one or more improved mechanical properties.

B. Description of the Related Art

A simplified liquid crystal pixel device is illustrated in FIG. 1. A typical liquid crystal display (LCD) pixel includes a birefringent liquid crystal layer 300 sandwiched between a pair of transparent electrodes 200, 202 such as indium tin oxide glass (ITO). The electrodes 200, 202 include surface treatments that orient the liquid crystal molecules. For instance, in a twisted nematic phase device a first electrode 200 would include unidirectional horizontal grooves 201 aligned with an x-axis, and a second electrode 202 would include vertical grooves 203 aligned with a y-axis. The electrodes are themselves sandwiched between first and second polarizing layers 100, 102 oriented at right angles to each other. Each polarizing layer is aligned with its adjacent electrode so that properly polarized light will pass through both. A light source 400, e.g. a back light, is positioned at one side of the pixel. Typically, the layer of liquid crystal molecules is aligned within the device so that it rotates polarized light passing through it by 90°. Accordingly, light passes through the device from the light source at a back side and is observable at a front side. However, when the liquid crystal layer 300 is energized the liquid crystal molecules reorient in the electric field and thus rotate incident polarized light insufficiently to pass through the second polarizer 102. Therefore, the light is blocked by the second polarizing layer. The net effect is that substantially no light can pass through the pixel while the liquid crystal is energized.

Since the liquid crystal layer is birefringent, the light exiting such a device has two indices of refraction, i.e. a parallel component referred to as "extraordinary" and a perpendicular component referred to as "ordinary." The magnitude of birefringence $\Delta n$ is the difference between these two components (see Eq. 1).

The arc through which the image quality is acceptable is regarded as the viewing angle. Importantly, the size of the viewing angle is directly tied to the birefringence of the liquid crystal layer. Specifically, if the parallel and perpendicular components are equal then the viewing angle approaches 180°. However, generally one component is much larger than the other. The larger the difference, the smaller the viewing angle. For example, a liquid crystal layer may have a much higher parallel component. Accordingly, such a device would have a small viewing angle. An optical compensation film brings the parallel and perpendicular components into balance, thereby reducing the magnitude of $\Delta n$, and increasing the viewing angle.

$$\Delta n = n_o - n_e = n_\perp - n_\parallel \qquad \text{Eq. 1}$$

Optical compensation films are known in the liquid crystal arts. However, polystyrene is generally regarded as a poor material choice because of its retardation ($\Gamma$) instability. As shown in Eq. 2, retardation ($\Gamma$) is the product of material thickness (d), and birefringence ($\Delta n$). In part this is attributable to its relatively large photoelasticity modulus around a normal operating temperature range. Accordingly, polystyrene's retardation is very sensitive to small stresses. Additionally, the retardation of polystyrene is a strong function of wavelength, and polystyrene has poor heat resistance properties. For these reasons, polystyrene is not typically used for optical compensation films.

$$\Gamma = \Delta n \cdot d \qquad \text{Eq. 2}$$

Brominated polystyrenes are known in the chemical arts, but have not been applied to the optical compensation film arts because of a variety of persistent problems. For instance, brominated polystyrene products having various degrees of bromination are often incompatible. This incompatibility can be observed by mixing two brominated polystyrenes with different degrees of substitution (DS) in a solvent. For example, mixing two samples of DS=1 (monobrominated) and DS=2 (dibrominated) products in 1,2-dichloroethane would result in a hazy solution, although each are soluble in the same solvent in the absence of the other. The hazy solution is a problem for optical film application since clear films cannot be cast. This problem can occur not only in two different bromination products but also in a single product. A bromination product that is produced by some processes can include molecules with significantly different degrees of substitution, which in turn causes the incompatibility problem and renders the product unsuitable for optical film application.

Furthermore, products that are prepared using higher-temperature processes, longer reaction times, and/or higher catalyst levels can have molecular weights too low to yield films with sufficient integrity due to polymer degradation during the bromination process.

Some embodiments of the present invention provide brominated polystyrenes that overcome one or more of the shortcomings of the prior art, and are suitable for use as optical compensation films.

II. SUMMARY OF THE INVENTION

Some embodiments of the present invention relate to an optical compensation film, comprising: an anisotropic polymer composition according to $[(CH_2CH)Ar]_n$, wherein the Ar group comprises one or more of benzene, naphthalene, anthracene, phenanthrene, or pyrene; and wherein the Ar group comprises at least one Br atom substituent; and the polymer composition defining an optically clear film having a positive birefringence.

Some embodiments relate to a process for preparing brominated polystyrene suitable for optical compensation films comprising the steps of: preparing an approximately 5 to 20 weight percent solution of a styrenic polymer in a suitable organic solvent; adding a Lewis acid catalyst to the styrenic polymer solution, wherein the amount of Lewis acid catalyst added is about 0.3 to 2.0 weight percent relative to the total mass of the styrenic polymer; adjusting the temperature of the solution of styrenic polymer and Lewis acid catalyst to about −10 to 10° C.; adding about 0.8 to about 1.6 equivalents of a brominating agent to the solution of styrenic polymer and Lewis acid catalyst over a period of about 2 to 60 minutes while vigorously stirring; and isolating a fibrous powder reaction product.

Some embodiments relate to a process for preparing an acylated and brominated polystyrene suitable for optical compensation films comprising the steps of: preparing an approximately 5 to 20 weight percent solution of a styrenic polymer in a suitable organic solvent; adding to the styrenic polymer solution the following two components in any order while stirring i) a C2-C18 acyl halide or anhydride in an amount of about 0.01 to about 0.3 equivalent ratio, relative to the equivalent of the styrenic monomer unit, and ii) a Lewis acid catalyst in an amount of about 0.9 to 1.2 mole ratio, relative to the total moles of the acyl halide and/or anhydride, wherein the combination comprises a reaction mixture; stirring the reaction mixture for about 5 to 120 minutes; adjusting the temperature of the reaction mixture to about −10 to 10° C.; adding about 0.8 to about 1.6 equivalents of a brominating agent to the reaction mixture over a period of about 2 to 60 minutes while vigorously stirring the reaction mixture; isolating a fibrous powder reaction product.

Some embodiments relate to an improved liquid crystal display pixel, comprising: a first polarizing layer having a front face and a back face; a first electrode having a front face and a back face and receiving the first polarizing layer at the back face of the first electrode; a second polarizing layer having a front face and a back face; a second electrode having a front face and a back face and receiving the second polarizing layer at the front face of the second electrode; a liquid crystal layer operatively disposed between the first and second electrodes; a back light or reflective component disposed behind the back face of the first polarizing layer; and the improvement comprising an optical compensation film operatively disposed between the first and the second polarizing layers, the film comprising one or more brominated polystyrene compositions and/or brominated and acylated polystyrene compositions.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a perspective view of a simplified LCD device.

IV. DETAILED DESCRIPTION OF THE INVENTION

According to some embodiments, optical quality films of brominated polystyrene are formed according to a bromination process where the degree of bromination is sufficiently controlled. In stark contrast to the prior art, the brominated styrenic polymer compositions produced by process embodiments of the present invention are capable of forming films with substantial optical clarity and low color. Accordingly, some composition embodiments are suitable for use as optical coatings on various substrates. Furthermore, according to some embodiments compositions can have mechanical properties suitable for making free-standing films and/or monoliths.

Brominated Styrenic Compositions

In one embodiment there is provided a process for the preparation of brominated styrenic polymer suitable for making optical films. More specifically, according to some embodiments such a process comprises a) preparing a 5 to 20 wt. % solution of a styrenic polymer in a suitable organic solvent; b) adding to the above solution a Lewis acid catalyst in an amount of about 0.3 to 2.0 wt. %, based on the total weight of the styrenic polymer, at room temperature or at a temperature of about −10 to 10° C.; c) feeding a brominating agent to the vigorously stirred reaction mixture above at a temperature of about −10 to 10° C. and at an equivalent ratio of bromo/styrenic monomer unit of about 0.8 to 1.6 in such a manner that the addition is completed in about 2 to 60 minutes to yield a reaction product; and d) working up the resulting reaction product by a method known in the art to yield a fibrous, powdery product having low color and good solubility in an organic solvent.

In order to retain the effectiveness of the catalyst, it is advantageous that the reaction is conducted under anhydrous conditions. Optionally, the reaction can be carried out in the presence of an inert atmosphere such as nitrogen and/or argon gas. A positive pressure may be applied to the inert gas so that the flow of which can carry gaseous byproducts such as hydrogen bromide to a container with an aqueous inorganic base that is capable of neutralizing the acidic gases.

The styrenic polymer used in the invention may be any vinyl polymer with an aromatic ring that is capable of undergoing a substitution reaction to incorporate a bromo group on the aromatic ring. Examples of such a styrenic polymer can include one or more of polystyrene, poly(4-vinyliphenyl), poly(vinyl naphthalene), poly(vinyl anthracene), poly(vinyl pyrene), and the like. According to some embodiments, polystyrene can be particularly advantageous. The polystyrene used for bromination, according to some embodiments of the invention, advantageously has a weight average molecular weight ($M_w$) of about 200,000 to 500,000 g/mole as determined by gel permeation chromatography (GPC).

According to some embodiments, a styrenic polymer concentration suitable for reactions, according to some embodiments, can be from about 5 to 20 wt. %. More specifically, some suitable concentrations can include from about 5 to 8 wt. %, 8 to 10 wt. %, 10 to 12 wt. %, 12 to 14 wt. %, 14 to 16 wt. %, 16 to 18 wt. %, or 18 to 20 wt. %. Here as elsewhere in the specification and claims, ranges may be combined.

Suitable organic solvents for some embodiments include, but are not limited to, 1,2-dichloroethane, nitrobenzene, 3-nitrotoluene, carbon tetrachloride, chloroform, methylene chloride, bromochloromethane, carbon disulfide, N,N-dimethylformamide, N,N-dimethylacetamide, N-methylpyrrolidone, and suitable combinations thereof. Advantageously, suitable solvents can include 1,2-dichloroethane, methylene chloride, carbon tetrachloride, and chloroform.

According to some embodiments, it is advantageous that the solvent(s) used in the reaction is substantially anhydrous. Methods for drying organic solvents are known to one skilled in the art, and may include distillation and/or utilization of a drying agent such as, for example, sodium sulfate, magnesium sulfate, calcium chloride, phosphorous pentoxide, silica gel, molecular sieves, and the like or combinations thereof.

Examples of suitable Lewis acid catalysts include, without limitation, $AlCl_3$, $FeCl_3$, $FeCl_2$, $SnCl_4$, $AlBr_3$, $FeBr_3$, $SbCl_5$, $ZrCl_4$, $Sb_2O_3$, $ZnO$, $ZnCl_2$, and the like, and suitable combinations thereof. According to some embodiments, a particularly advantageous catalyst is $AlCl_3$ present in amounts of about 0.5 to 1.5 wt. %, and more advantageously about 0.7 to about 1.0 wt. %.

In some embodiments, suitable brominating agents can include bromine, bromine chloride, or mixtures thereof. Furthermore, any other reagent that is capable of rendering bromination on the aromatic rings of the styrenic polymer can be suitable. According to some embodiments, bromine and/or bromine chloride can be particularly advantageous. According to some embodiments, the brominating agent is used in an amount that has an equivalent ratio of bromo/styrenic monomer unit of about 0.8 to 1.6. Other suitable ranges can include about 0.9 to 1.3, or about 1.0 to 1.1. Furthermore, in some embodiments, the brominating agent can be added to the reaction mixture at a temperature of about −10 to 10° C., or about −5 to 5° C. Still further, according to some embodiments addition of the brominating agent can proceed at a relatively fast rate. For instance, the addition can be complete in about 2 to 45 minutes, or advantageously in 2 to 30 minutes.

According to some embodiments, the bromination reaction can be quenched when the addition of the brominating agent is finished or within a few minutes thereafter. For instance, in some embodiments the reaction can be quenched advantageously at about five to ten minutes following addition of the brominating agent, by adding water or an aqueous solution of an inorganic base such as, for example, sodium hydroxide or potassium hydroxide. The organic layer can be isolated and can be further extracted with a bromine scavenger such as, without limitation, sodium sulfite or sodium borohydride.

An organic layer so obtained can be worked up by methods known to those skilled in the art to afford a suitably pure brominated styrenic polymer product. For example, the organic layer can be filtered to remove solid impurities and subsequently fed into heated water at a temperature that is capable of flashing off the organic solvent to yield a precipitate. The resulting precipitate can then be further washed with methanol and/or water and subsequently dried to afford a suitably pure product. Alternatively, the crude organic layer can be precipitated into an alcohol such as methanol or ethanol. In this step, the resulting precipitate is typically a gel-like mass containing residual organic solvent, which requires further purification by re-dissolving the gel-like mass in an organic solvent, such as N-methylpyrrolidone (NMP), N,N-dimethylformamide (DMF), or cyclopentanone. A polymer solution thus obtained may require further filtration to remove insoluble impurities. The filtered polymer solution can then be re-precipitated into methanol to yield a suitably pure product.

In further embodiments a brominated styrenic polymer composition can be produced according to process embodiments of the present invention. Such a composition can have a bromine content of about 38 to about 55 wt. %, a weight average molecular weight of about 300,000 to 600,000 g/mol, and a $T_g$ of about 120° C. to 160° C. Advantageously, bromine content can be about 41 to about 50 wt. %, in some embodiments about 44 to about 46 wt. % can be more advantageous. An advantageous weight average molecular weight can be about 400,000 to 500,000, and an advantageous $T_g$ can be about 140° C. to 150° C.

A composition according to some embodiments can have low or no visible spectrum absorption, and may form clear solutions in suitable solvents. Examples of suitable solvents can include 1,2-dichloroethane, methylene chloride, chloroform, cyclopentanone, toluene, and suitable combinations thereof. A polymer solution thus obtained can then be cast onto a substrate to form a clear film. Suitable films can have a positive birefringence ranging from about 0.002 to about 0.008. The film can be used in a liquid crystal display device as a coating, or as a free-standing film laminated to another layer. Such films can be useful, for example, in liquid crystal displays and/or other optical components.

Some embodiments can include one or more plasticizers incorporated into the polymer film to enhance processability of the film. For instance, a plasticizer can be dissolved in a polymer solution and cast with the polymer to form a film. Accordingly, a suitable plasticizer is soluble in the desired solvent and compatible with the brominated styrenic polymer therein, thus forming a film with suitable optical clarity. Suitable plasticizers do not reduce the $T_g$ and/or the retardation of the film to an unacceptable level.

Examples of suitable plasticizers include, without limitation, those available from Eastman Chemical Company (Kingsport, Tenn.): Abitol E® (hydrogenated gum rosin), Permalyn 3100® (tall oil rosin ester of pentaerythritol), Permalyn 2085® (tall oil rosin ester of glycerol), Permalyn 6110® (gum rosin ester of pentaerythritol), Foralyn 110® (hydrogenated gum rosin ester of pentaerythritol), and Optifilm Enhanser 400®; those available from Unitex Chemical Corp. (Greensboro, N.C.): Uniplex 552® (pentaerythritol tetrabenzoate), Uniplex 280® (sucrose benzoate), and Uniplex® 809 (PEG di-2-ethylhexoate); Admex 523® available from Genovique (Rosemont, Ill.); triphenylphosphate; and suitable mixtures thereof.

In some embodiments, a polymer film embodiment further comprises 2 to 20 wt. % plasticizer, relative to the mass of brominated styrenic polymer. An advantageous plasticizer composition comprises one or more of Abitol E®, Permalyn 3100®, Permalyn 2085®, Permalyn 6110®, and Foralyn 110®. An advantageous ratio for a solid plasticizer, such as Permalyn 3100® and/or Permalyn 2085®, can be about 5 to 15%, whereas for a liquid plasticizer, such as Abitol E® and/or Optifilm Enhanser 400®, an advantageous ratio can be about 3 to 5%. Embodiments that include one or more plasticizers can advantageously have a $T_g$ of about 110 to 140° C.

Acylated/Brominated Compositions

In some embodiments, mechanical properties of a brominated styrenic polymer can be surprisingly improved by incorporating an acyl group onto the styrenic ring in addition to bromination. Acylation of the styrenic ring can be achieved by reacting the styrenic polymer with a C2-C18 acyl halide and/or a suitable anhydride in the presence of an effective amount of a Lewis acid catalyst. More specifically, in some embodiments, acylation can be carried out by reacting a styrenic polymer with from about 0.01 to about 0.3 equivalents of a C2-C18 acyl halide and/or anhydride relative to the number of styrenic monomer units. Advantageously, an equivalent ratio for the acyl halide is about 0.02 to 0.2. In some embodiments, 0.03 to 0.15 is even more advantageous. One of skill in the art will recognize that, as used herein, the terms "equivalents" and "equivalent ratio" can be used interchangeably with the term "degree of substitution" (DS), which denotes the average number of a substituent attached to one styrenic unit. Furthermore, in some embodiments, acylation can be carried out either prior to bromination or after bromination. Advantageously, the acylation is carried out first, followed by bromination.

In some embodiments a suitable degree of substitution of the polymer composition with one or more C2 to C18 acyl groups is from about 0.01 to about 0.5. Other suitable degrees of substitution can be from about 0.01 to 0.04, 0.04 to 0.08, 0.08 to 0.12, 0.12 to 0.16, 0.16 to 0.2, 0.2 to 0.24, 0.24 to 0.28, 0.28 to 0.32, 0.32 to 0.36, 0.36 to 0.40, 0.40 to 0.44, 0.44 to 0.48, or 0.48 to about 0.5.

Suitable acyl halide and/or anhydride reagents can include any linear or branched C2-C18 acid halide or acid anhydride with or without substituents on the hydrocarbon chain. Advantageously, a suitable acyl halide and/or anhydride can have a saturated hydrocarbon chain. However, acyl halides and/or anhydrides having unsaturated groups and/or other functional groups such as oxirane group can also be suitable. In another aspect of this invention, the unsaturated group and/or other functional groups in the polymer of this invention may be further reacted to enhance the polymer properties. Furthermore, suitable acyl halides and/or anhydrides can be aliphatic, aromatic with or without substituents on the ring, or can comprise both aliphatic and aromatic moieties. Examples of suitable C2-C18 acyl halides and/or anhydrides include, without limitation, hexanoyl chloride, heptanoyl chloride, 2-ethylhexanoyl chloride, dodecanoyl chloride, butanoyl chloride, butanoic anhydride, isobutyryl chloride, isobutyryl anhydride, pentanoyl chloride, acetyl chloride, acetic anhydride, octanoyl chloride, decanoyl chloride, dodecanoyl chloride, hexadecanoyl chloride, octadecanoyl chloride, benzoyl chloride, 4-methoxybenzoyl chloride, levulinic acid halide, 2,2-dimethylpentanoic acid halide, linoleic acid chloride, oleic acid anhydride, vernolic acid chloride, and any suitable combination thereof. Advantageously, a suitable acyl halide can be selected from one or more of hexanoyl chloride, 2-ethylhexanoyl chloride, decanoyl chloride, dodecanoyl chloride, hexadecanoyl chloride, octadecanoyl chloride, and benzoyl chloride.

According to some embodiments, suitable acyl halides and/or anhydrides can also include acid halide and/or anhydride derivatives prepared from commercial products including blends of various fatty acids. Such commercial products include, without limitation, those available from Proctor and Gamble Chemicals (Cincinnati, Ohio) having trade names of C-101®, C-108®, C-110®, C-810®, C-1095®, C-1214®, C-1218D®, and the like or suitable combinations thereof.

According to some acylated embodiments, bromination can be carried out by reacting the acylated styrenic polymer with about 0.8 to about 1.6 equivalents of a brominating agent, relative to the number of styrenic monomer units. Advantageously, an equivalent ratio for the brominating agent can be about 0.85 to 1.3. In some embodiments, 0.9 to 1.1 can be even more advantageous.

According to some embodiments, a process for preparing an acylated/brominated styrenic polymer comprising the steps of a) preparing a 5-20 wt. % solution of a styrenic polymer in a suitable organic solvent, b) adding the following two components in any order to the stirred solution of step "a": i) a C2-C18 acyl halide or anhydride in an amount of about 0.01 to about 0.3 equivalent ratio, based on the equivalent of the styrenic monomer unit, and ii) a Lewis acid catalyst in an amount of about 0.9 to 1.2 mole ratio, based on the total moles of the acyl halide and/or anhydride in "i", c) allowing the stirring of the above reaction mixture to continue for about 5 to 120 minutes, d) optionally adding to the above mixture a Lewis acid catalyst in an amount of about 0.3 to 1.5 wt. %, based on the total weight of the styrenic polymer, at room temperature or at a reduced temperature, e) feeding a brominating agent, in an equivalent ratio of bromo/styrenic monomer unit equal to about 0.8 to 1.6, to the vigorously stirred reaction mixture above at a temperature of about −10 to 10° C. in such a manner that the addition is completed in about 2 to 60 minutes to yield a reaction product, and f) working up the resulting reaction product by a method known in the art to yield a fibrous, powdery product having low color and good solubility in an organic solvent.

In some embodiments, a process for preparing an acylated/brominated styrenic polymer can be optionally carried out under an inert atmosphere such as nitrogen or argon gas. A positive pressure can be applied to the inert gas so that the flow of which can carry the gaseous byproducts such as hydrogen bromide to a container with an aqueous inorganic base that is capable of neutralizing the acidic gases.

Examples of the Lewis acid catalyst used in (i) and/or (e) include, without limitation, $AlCl_3$, $FeCl_3$, $FeCl_2$, $SnCl_4$, $AlBr_3$, $FeBr_3$, $SbCl_5$, $ZrCl_4$, $Sb_2O_3$, $ZnO$, $ZnCl_2$, and the like, and suitable combinations thereof. According to some embodiments, a particularly advantageous catalyst is $AlCl_3$.

A suitable acylation reaction time can be from about 5 to 120 minutes. Other suitable reaction times can be from about 5 to 10 minutes, 10 to 15 minutes, 15 to 20 minutes, 20 to 25 minutes, 25 to 30 minutes, 30 to 35 minutes, 35 to 40 minutes, 40 to 45 minutes, 45 to 50 minutes, 50 to 55 minutes, 55 to 60 minutes, 60 to 65 minutes, 65 to 70 minutes, 70 to 75 minutes, 75 to 80 minutes, 80 to 85 minutes, 85 to 90 minutes, 90 to 95 minutes, 95 to 100 minutes, 100 to 105 minutes, 105 to 110 minutes, 110 to 115 minutes, or even 115 to 120 minutes. According to some embodiments a particularly advantageous range can be from about 15 to 60 minutes.

Furthermore, according to some embodiments, acylation can be carried out from about 0° C. to about the reflux temperature of the chosen solvent. However, according to some embodiments, the temperature range from about 15 to 30° C. can be especially advantageous.

An acylated/brominated styrenic polymer composition, according to embodiments of the present invention, can advantageously have a weight average molecular weight of about 300,000 to 600,000 g/mol. Further, such compositions can advantageously have a $T_g$ of about 90 to 160° C.; or, in some embodiments, more advantageously from about 120 to about 160° C. Still further, such compositions can advantageously have a break strain greater than about 1.0% and a break stress greater than about 3000 psi (20.7 MPa) according to ASTM method D882. Such a composition can be dissolved in an organic solvent to form a substantially clear solution. Suitable solvents include 1,2-dichloroethane, methylene chloride, chloroform, cyclopentanone, toluene, and a mixture thereof. A polymer solution thus obtained can be cast onto a substrate to form a clear film. Such films have a positive birefringence ranging from about 0.002 to about 0.008. Furthermore, such films have improved mechanical properties, such as tensile elongation, tensile strength, and tensile modulus, over brominated styrenic polymers without acylation. Still further, such films can be suitable for use in a liquid crystal display devices as a coating or as a free-standing film laminated to a layer.

In some embodiments, a polymer film embodiment further comprises 2 to 20 wt. % plasticizer, relative to the mass of acylated/brominated styrenic polymer. An advantageous plasticizer composition comprises one or more of Abitol E®, Permalyn 3100®, Permalyn 2085®, Permalyn 6110®, and Foralyn 110®. An advantageous ratio for a solid plasticizer, such as Permalyn 3100® and Permalyn 2085®, can be about 5 to 15%, whereas for a liquid plasticizer, such as Abitol E® and Optifilm Enhancer 400®, an advantageous ratio can be about 3 to 5%.

EXAMPLE 1

Bromination of Polystyrene (Equivalent Ratio of Bromo/Styrenic Monomer Unit of about 1.0)

Polystyrene (50.0 g) (Mw 280,000; Aldrich) is stirred and dissolved in 1,2-dichloroethane (500 g) in a one-liter, three-neck, round-bottom flask equipped with a mechanical stirrer, a nitrogen inlet, and a nitrogen outlet. A positive pressure is applied to allow the nitrogen gas to flow through the reactor, carrying the acid fumes generated during the reaction to a container of dilute NaOH solution. The temperature of the polystyrene solution is reduced to less than 10° C. by immersing the reaction vessel into an ice water bath. To the cold, stirring, mixture is added $AlCl_3$ (0.75 g) all at once, followed by dropwise addition of bromine (76.92 g) (Br/styrene equivalent ratio, 1.0) over a period of 30 minutes. The mixture is allowed to react at low temperature under nitrogen for an additional 10 minutes. The reaction is then quenched by adding distilled water (200 g) and KOH (15% in water, 30 g). The resulting mixture is poured into a beaker with additional water and the organic layer is separated, which is subsequently precipitated into methanol providing a soft solid mass. The solid mass is re-dissolved in N-methylpyrrolidone (NMP, 800 g) and the solution is filtered to remove solid impurities. The filtered solution is re-precipitated into methanol. The resulting white fibrous solid is collected by vacuum filtration, washed first with water and then with methanol, and dried under vacuum. A yield according to this example is about: 78 g ($T_g$ 145° C.; weight average molecular weight (Mw) 370,000).

EXAMPLE 2

Polymer Films Based on Brominated Polystyrene with Various Plasticizers

Various polymer solutions with plasticizers are prepared by mixing an approximately 15% solution of a brominated polystyrene prepared according to Example 1 in either 1,2-dichloroethane (DCE) or dichloromethane (DCM) with an approximately 15% solution of a plasticizer in DCE at various ratios. Each polymer solution is then drawn down on a glass plate using an applicator and subsequently covered. The wet film is allowed to dry at room temperature for about 30 minutes while covered and for additional 30 minutes uncovered. A dried film thus prepared is then wetted with water and subsequently removed from the glass substrate. Table 1 includes a list of the films prepared according to this method. Polymer films 1 to 9 are cast using DCE as the solvent, while films 9 to 11 are cast using DCM as the solvent. Retardation is determined by ellipsometry, and glass transition temperature ($T_g$) is determined by DSC.

TABLE 1

Polymer Films Cast Using 1,2-Dichloroethane as the Solvent

| Polymer Film | Plasticizer Used | Film Thickness, μm | Retardation, nm | Film Tg, °C. |
|---|---|---|---|---|
| 1 | 5% Permalyn 2085 | 44 | 128 | 131 |
| 2 | 7% Permalyn 2085 | 44 | 104 | 129 |
| 3 | 10% Permalyn 2085 | 43 | 85 | 125 |
| 4 | 15% Permalyn 2085 | 44 | 32 | 118 |
| 5 | 5% Permalyn 3100 | 44 | 127 | 135 |
| 6 | 7% Permalyn 3100 | 44 | 104 | 132 |
| 7 | 10% Permalyn 3100 | 45 | 72 | 128 |
| 8 | 15% Permalyn 3100 | 42 | 46 | 122 |

TABLE 2

Polymer Films Cast Using Dichloromethane as the Solvent

| Polymer Film | Plasticizer Used | Film Thickness, μm | Retardation, nm | Film Tg, °C. |
|---|---|---|---|---|
| 9 | 5% Abitol E | 43 | 88 | 120 |
| 10 | 15% Permalyn 2085 | 47 | 50 | 113 |
| 11 | 15% Permalyn 3100 | 47 | 67 | 121 |

EXAMPLE 3

Acylation/Bromination of Polystyrene (DS of C6=0.1; DS of Br=1.0)

A 2 L three-necked round-bottomed flask equipped with a mechanic stirrer, a nitrogen inlet, and an outlet to an oil bubbler is oven-dried and cooled to room temperature under flow of nitrogen. The flask is charged with a stock solution (500 g) of 10% polystyrene in dry dichloromethane. With continued stirring, n-caproyl chloride (6.46 g, 0.048 mol) is added via syringe. The mixture is stirred for about five minutes, and anhydrous aluminum chloride powder (6.53 g, 0.049 mol) is added to the flask with vigorous stirring. Stirring is continued at room temperature for about one hour, then the flask is cooled by immersion in a slush of ice and water for about 10 minutes. During this period of time, bromine (76.7 g, 0.480 mol) is weighed into a dropping funnel having a pressure-equalization arm. A stopper is fitted on top of the dropping funnel. The nitrogen inlet is replaced with the dropping funnel. Bromine (approximately 4-8 g) is added to the mixture, and additional aluminum chloride (150-500 mg) is added to the flask with vigorous stirring. The reaction mixture evolves hydrogen bromide rapidly. The rest of the bromine is added in about five minutes. Stirring is allowed to continue for additional two minutes, or so until substantially no further HBr evolves. The reaction mixture is quenched with 1000 mL of water and allowed to stir for about two hours. The aqueous layer is decanted, replaced with distilled water, and stirred for an additional 20 minutes. This washing procedure is repeated twice and the product is precipitated into methanol. The product is then air dried and redissolved in toluene and DMF, filtered, and precipitated into methanol as fibers. The product has a $T_g$ of about 134° C., and produces a film having a birefringence (Δn) at 633 nm of about 0.0041.

EXAMPLE 4

Acylation/Bromination of Polystyrene (Targeted: DS of C12=0.1; DS of Br=1.0)

A 2 L three-necked round-bottomed flask equipped with a mechanical stirrer, a nitrogen inlet, and an outlet to an oil bubbler is oven-dried and cooled to room temperature under flow of nitrogen. The flask is charged with a stock solution (500 g) of 10% polystyrene in dry dichloromethane. With continued stirring, n-dodecanoyl chloride (10.50 g, 0.048 mol) is added via a syringe. The mixture is stirred for five minutes, and anhydrous aluminum chloride powder (6.53 g, 0.049 mol) is added to the flask with vigorous stirring. Stirring is continued at room temperature for about one hour, then the flask is cooled by immersion in a slush of ice and water for about 10 minutes. During this period of time, bromine (76.7 g, 0.480 mol) is weighed into a dropping funnel having a pressure-equalization arm. A stopper is fitted on top of the dropping funnel and the nitrogen inlet is replaced with the dropping funnel. Bromine (approximately 4-8 g) is added to the mixture and additional aluminum chloride (150-500 mg) is added to the flask with vigorous stirring. The reaction mixture evolves hydrogen bromide rapidly. The rest of the bromine is added in about five minutes. Stirring is allowed to continue for additional two minutes, or until substantially no further HBr evolves. The reaction mixture is then quenched with 1000 mL of water and allowed to stir for about two hours. The aqueous layer is decanted, replaced with distilled water, and stirred for an additional 20 minutes. This washing procedure is repeated twice and the product is precipitated into methanol. The product is then air dried and redissolved in toluene and DMF, filtered, and precipitated into methanol as fibers. The product has a $T_g$ of about 116° C., and produces a film having a birefringence (Δn) at 633 nm of about 0.0038.

EXAMPLE 5

Polymer Films Based on Acylated/Brominated Polystyrenes

In accordance with procedures set forth in Examples 3 and 4, two additional polymers are prepared having C6 (0.05)/Br (0.95) and C12(0.05)/Br (0.95) respectively. Various polymer solutions (15 wt. %) are prepared by dissolving each of the acylated/brominated polystyrene compositions in 1,2-dichloroethane as indicated in Table 3. Each polymer solution is then drawn down on a glass plate using an applicator and then covered. The wet film is allowed to dry at room temperature for 30 minutes covered, and for additional two hours uncovered. A dried film thus prepared is then wetted with water and removed from the glass substrate. The following is a list of films that can be prepared according to this method and their expected properties.

TABLE 3

Polymer Films Cast Using 1,2-Dichloroethane as the Solvent

| Polymer Film | Acylation (DS)/ Bromination (DS) | Film Thickness, μm | Retardation, nm | Film $T_g$, °C |
|---|---|---|---|---|
| 12 (0112-05) | C6 (0.05)/Br (0.95) | 45 | 188 | 135 |
| 13 (0112-07) | C12 (0.05)/Br (0.95) | 45 | | 122 |
| 14 (0225-1) | C6 (0.1)/Br (1.0) | 40 | 168 | 134 |
| 15 (0225-3) | C12 (0.1)/Br (1.0) | 40 | 114 | 116 |

EXAMPLE 6

Tensile Properties of Various Polymer Films

The mechanical properties of various polymer films prepared above are determined using ASTM Method D882. In Table 4, polymer films 12-15 are based on acylated/brominated polystyrenes, while films 4, 9, and 10 are based on brominated polystyrenes with plasticizers as described herein.

TABLE 4

Tensile Properties of Various Polymer Films

| | Film 12 | Film 13 | Film 14 | Film 15 | Film 4 | Film 9 | Film 10 |
|---|---|---|---|---|---|---|---|
| Break Strain (%) | 1.55 | 1.26 | 1.32 | 1.54 | 0.50 | 0.75 | 0.60 |
| Break Stress (psi) | 6051 | 4940 | 5005 | 5093 | 1696 | 3268 | 1759 |

EXAMPLE 7

Bromination of Polystyrene (Equivalent Ratio of Bromo/Styrenic Monomer Unit of about 1.0)

This example illustrates a particularly economical process embodiment for working up a reaction mixture. The embodiment involves substantially simultaneously flashing off the solvent and precipitating the product. Polystyrene (25.0 g) (Mw 280,000; Aldrich) is stirred and dissolved in 1,2-dichloroethane (200 g) in a one-liter three-neck round-bottom flask equipped with a mechanical stirrer, a nitrogen inlet, and a nitrogen outlet. A positive pressure is applied to allow nitrogen gas to flow through the reactor, carrying the acid fumes generated during the reaction to a container of dilute NaOH solution. The temperature of the polystyrene solution is reduced to less than about 10° C. by immersing the reaction vessel into an ice water bath. $AlCl_3$ (0.375 g) is added to the chilled mixture all at once with stirring, followed by dropwise addition of bromine (38.46 g) (Br/styrene equivalent ratio, 1/1) over a period of 30 minutes. The mixture is allowed to react at low temperature under nitrogen for an additional 10 minutes. The reaction is then quenched by adding distilled water (100 g) and KOH (15% in water, 15 g). The resulting mixture is poured into a beaker with additional water and the organic layer is separated. The resulting polymer solution is collected in an addition funnel and slowly fed into distilled water that is heated to about 85° C. to simultaneously flash off the solvent and form a white precipitate in water. A precipitate thus obtained is collected, washed repeatedly with methanol, and dried to yield a powdery product having a $T_g$ of about 134° C. and a weight average molecular weight (Mw) of about 404,000.

EXAMPLE 8

Bromination of Polystyrene (Equivalent Ratio of Bromo/Styrenic Monomer Unit of about 1.0)

A 30 L glass reactor equipped with a mechanical stirrer is charged with polystyrene (2.00 kg) and 1,2-dichloroethane (16.5 kg). The mixture is stirred at room temperature to form a solution, and then cooled to about 0° C. $AlCl_3$ (20 g) is added all at once to the chilled mixture with stirring, followed by dropwise addition of bromine (3.10 kg) through an additional funnel over a period of about 16 minutes. The reaction proceeds rapidly and evolves hydrogen bromide which is fed to a neutralizing solution of potassium hydroxide. Stirring continues for another 10 minutes after completing bromine addition, and water is then added to the reactor to quench the reaction. The organic layer is washed with water several times and filtered through a pressure filter to remove any insoluble impurities. The resulting filtrate is then slowly fed to a reactor of water heated to more than about 85° C. to simultaneously boil off 1,2-dichloroethane and form a white precipitate. A precipitate thus obtained is collected and dried to yield a powdery product having an inherent viscosity in NMP of about 0.67.

EXAMPLE 9

Acylation/Bromination of Polystyrene (Targeted: DS of C18&C16=0.05; DS of Br=1.0)

A 2 L three-necked round-bottomed flask equipped with a mechanical stirrer, a nitrogen inlet, and an outlet to an oil bubbler is oven-dried and cooled to room temperature under flow of nitrogen. The flask is charged with a stock solution (200 g) of about 10% polystyrene in dry dichloromethane. With continued stirring, stearoyl chloride (60%) and palmitoyl chloride (40%) (2.91 g, 0.01 mol) are added via syringe. The mixture is stirred for about five minutes, and anhydrous aluminum chloride powder (1.40 g, 0.0105 mol) is added to the flask with vigorous stirring. Stirring is continued at room temperature for about one hour, and then the flask is cooled by immersion in a slush of ice and water for about 10 minutes. During this period of time, bromine (30.7 g, 0.192 mol) is weighed into a dropping funnel having a pressure-equalization arm. A stopper is fitted on top of the dropping funnel, and the nitrogen inlet is replaced with the dropping funnel. Bromine (approximately 4-8 g) is added to the mixture and additional aluminum chloride (180 mg) is added to the flask with vigorous stirring. The reaction proceeds rapidly and evolves hydrogen bromide. The rest of the bromine is added over a period of about five minutes. Stirring is allowed to continue for about an additional two minutes, or until substantially no further HBr evolves. The reaction mixture is then quenched with 200 mL of water and allowed to stir for about two hours. The aqueous layer is decanted, replaced with distilled water, and stirred for an additional 20 minutes. This washing procedure is repeated twice and the product is precipitated into methanol. The product is then air dried and redissolved in toluene and DMF, filtered, and precipitated into methanol as fibers. The product has a $T_g$ of about 117° C., and forms a film having a birefringence ($\Delta n$) at 633 nm of about 0.004.

It will be apparent to those skilled in the art that the above compositions, methods, and apparatuses can incorporate changes and modifications without departing from the general scope of this invention. It is intended to include all such modifications and alterations insofar as they come within the scope of the appended claims or the equivalents thereof.

Having thus described the invention, it is now claimed:

We claim:

1. An optical compensation film, comprising:
    an anisotropic polymer composition according to $[(CH_2CH)Ar]_n$, wherein the Ar group comprises one or more of benzene, naphthalene, anthracene, phenanthrene, or pyrene, wherein the anisotropic polymer composition comprises a C2 to C18 acyl group degree of substitution from about 0.01 to about 0.5;
    wherein the Ar group comprises at least one Br atom substituent; and
    the polymer composition defining an optical film having a positive birefringence, wherein the Ar group further comprises at least one linear and/or branched C2 to C18 acyl substituent group.

2. The optical compensation film of claim 1, wherein the at least one acyl group is selected from one or more of hexanoyl, heptanoyl, 2-ethylhexanoyl, dodecanoyl, butanoyl, isobutyryl, pentanoyl, acetyl, octanoyl, decanoyl, hexadecanoyl, octadecanoyl, benzoyl, 4-methoxybenzoyl, levulinoyl, or 2,2-dimethylpentanoyl.

3. The optical compensation film of claim 2, wherein at least one acyl group is selected from one or more of hexanoyl, 2-ethylhexanoyl, decanoyl, dodecanoyl, hexadecanoyl, octadecanoyl, or benzoyl.

4. The optical compensation film of claim 1, wherein the weight average molecular weight of the anisotropic polymer composition is from about 300,000 to about 600,000 g/mol.

5. The optical compensation film of claim 1, wherein the glass transition temperature of the anisotropic polymer composition is from about 90 to 160°C.

6. The optical compensation film of claim 1, wherein the break strain is from about 1 to about 2%, and the break stress is from about 4500 to about 6500 psi.

7. The optical compensation film of claim 1, wherein the retardation of the film is from about 100 to about 200 nm, and the film thickness is about 40 to 50 μm, wherein the film is optically clear.

* * * * *